US006650728B2

(12) United States Patent
Michaelsen et al.

(10) Patent No.: US 6,650,728 B2
(45) Date of Patent: Nov. 18, 2003

(54) APPARATUS AND METHOD FOR THE ANALYSIS OF ATOMIC AND MOLECULAR ELEMENTS BY WAVELENGTH DISPERSIVE X-RAY SPECTROMETRIC DEVICES

(75) Inventors: Carsten Michaelsen, Geesthact (DE); Rudiger Bormann, Rosengarten (DE); Jörg Wiesmann, Lüneburg (DE)

(73) Assignee: Forschungszentrum Geesthacht, Geesthacht (DE)

( * ) Notice: Subject to any disclaimer, the term of this patent is extended or adjusted under 35 U.S.C. 154(b) by 0 days.

(21) Appl. No.: 10/196,806

(22) Filed: Jul. 17, 2002

(65) Prior Publication Data

US 2003/0026383 A1 Feb. 6, 2003

(51) Int. Cl.[7] ............................................. G01N 23/223
(52) U.S. Cl. ............................................. 378/49; 378/84
(58) Field of Search ............................... 378/49, 84, 85

*Primary Examiner*—Craig E. Church
(74) *Attorney, Agent, or Firm*—Klaus J. Bach

(57) ABSTRACT

In an apparatus and a method for the analysis of atomic or molecular elements contained in a sample by wavelength dispersive X-ray spectrometry, wherein primary x ray or electron radiation is directed onto the sample whereby fluorescence radiation is emitted from the sample, the fluorescence radiation is directed onto a mirror or focussing device consisting of a multi-layer structure including pairs of layers of which one layer of a pair consists of lanthanum and the other consists of carbon and the fluorescence radiation is reflected from the mirror or focussing device onto an analysis detector for the analysis of the atomic or molecular elements contained in the sample.

13 Claims, 2 Drawing Sheets

APPARATUS AND METHOD FOR THE ANALYSIS OF ATOMIC AND MOLECULAR ELEMENTS BY WAVELENGTH DISPERSIVE X-RAY SPECTROMETRIC DEVICES

BACKGROUND OF THE INVENTION

The invention relates to an apparatus for the analysis of atomic and/or molecular elements by wavelength dispersive X-ray spectrometric devices comprising at least one reflection or focussing device including a multi-layer structure, particularly an apparatus wherein fluorescence rays generated by a sample to be analyzed when subjected to incident primary X-ray or electron radiation are directed onto a mirror or focussing device before reaching a measuring or analysis detector. The mirror or focussing device is formed by a multi-layer structure comprising layer pairs each including a first layer element formed by lanthanum. The invention also resides in an analysis method employing such apparatus.

Apparatus and methods of this type are known for example from DE OS 199 26 036. They are used in scientific analyses but also in industrial applications for the detection of atomic and/or molecular elements in various areas for example when impurities or disturbances present in examples in only small amounts are to be detected or analyzed.

In that case, X-ray or electron beams from any type of X-ray or electron source are directed onto a sample whereby, among others, fluorescence rays are returned from the sample which are induced by the incident X-rays by a well-known physical processes. These fluorescence rays are directed onto a suitable crystal where they are reflected and then directed onto a measuring and analysis arrangement for example in the form of a fluorescence radiation-selective detector. The crystals act as analyzers. These crystals which can be artificial crystals. may consist of thin multiple alternate layers of two or more materials with different X-ray optical properties. In connection with the above example, the incident fluorescent rays are reflected from these layers but only that part of the fluorescent rays for which the Bragg equation.

$$n\lambda = 2d \sin \theta$$

is fulfilled,
Herein: $\lambda(nm) = 1.24/E(keV)$
wherein n is a natural number (n=1, 2, 3, 4 ...)
$\lambda$=the wavelength of the x rays, that is,
d=the periodicity (lattice parameter) of the analyzer crystal,
$2\theta$=diffraction angle, and
E=energy of the X-rays.

Taking into consideration the effect of the refraction, which is very small for X-rays, results in an equation which is modified from the first equation whereby from the set angles $\theta$ and the lattice parameter d of the analyzer the wavelength of the reflected X-rays can be determined from the first equation or the modification thereof. By varying the angle therefore the wavelength of the reflected rays, that is in the above example the fluorescence rays, can be selected in a controlled manner.

The big advantage of the artificial crystals which consist of many regularly changing layers—called in this connection also multi-layer arrangement—is that the materials, of which the multi-layer arrangement consists, can be selected and optimized for best results. This is an essential advantage of the manufactured multi-layer arrangement as compared to natural crystals.

The intensity of the reflected radiation depends greatly on the materials used for the multi-layer. In addition, the lattice parameters of the multi-layer can be modified within a larger range than it is possible with natural crystals.

It is a particular advantage of the multi-layer analyzer that it facilitates the analysis of light elements with uniform intensity and without health-endangering side effects.

In many cases so far the multi-layer structure or, respectively, the individual layers of the multi-layer structure, have been adapted specifically to the element expected to be analyzed. For the special case of an energy range of 100 to 180 eV, that is, particularly for the detection of beryllium and boron, in the past, tungsten-carbon multi-layers have been used. Newer developments of lanthanum boron carbide multi-layer arrangements further improve the detection limit of boron, see DE OS 199 26056 referred to earlier. For the detection of carbon at energies of about 277 eV, multi-layer arrangements of vanadium-, or respectively, nickel-carbon have been used, see also U.S. Pat. No. 4,785,470.

Multi-layer arrangements which are utilized mainly in x-ray spectrometers for the detection of boron and beryllium (Mo—$B_4C$) or which provide the best detection limits (La—$B_4C$) have only a small reflectivity of 3 to 0.9% for carbon. The reason herefor is that, in the light layer material $B_4C$, boron is contained which is an element whose absorption edge is at an energy below the carbon emission line of 277 eV. Therefore the carbon radiation of multi-layer structures including $B_4C$ is highly absorbed. In contrast, the multi-layers V—C and Cr—C, which are optimized for the carbon detection are not well suited for the detection of the light elements beryllium and boron, because their reflectivity in comparison with lanthanum containing multi-layer arrangements is lower by more than the factor 2. This low reflectivity is insufficient for the detection of the light element B and Be, mainly because the light elements have a substantially smaller fluorescence yield than the heavier elements so that the expected count rates are comparatively low anyhow.

For the detection of the light elements beryllium to carbon, which have their highest reflectivity at energies of 108 183 and 277 eV, so far at least two different optimized multi-layer arrangements are necessary.

It is therefore the object of the present invention to provide an apparatus and a method with which a very much improved x-ray analysis for the detection of beryllium, boron and carbon is possible, and wherein the apparatus as well as the method are to be set up and operated in a simple manner utilizing means known from the state of the art, so that present analysis apparatus and methods can be utilized without major changes whereby the apparatus and the method can be established relatively inexpensively and operated in a simple manner and at low costs by research institutions and industrial installations.

SUMMARY OF THE INVENTION

In an apparatus and a method for the analysis of atomic or molecular elements contained in a sample by wavelength dispersive X-ray spectrometry, wherein primary x ray or electron radiation is directed onto the sample whereby fluorescence radiation is emitted from the sample, the fluorescence radiation is directed onto a mirror or focussing device consisting of a multi-layer structure including pairs of layers of which one layer of a pair consists of lanthanum and the other consists of carbon and the fluorescence radiation is reflected from the mirror or focussing device onto an analysis detector for the analysis of the atomic or molecular elements contained in the sample.

The advantage of the apparatus and method according to the invention resides essentially in the fact that the combination of lanthanum and carbon according to the invention for the layer elements forming the layer pair in multi-layer arrangements for wavelength dispersive analyzers of x-rays in the energy range of about 108 eV for the detection of boron and in the range of about 277 eV are used for the detection of carbon. The particularly advantageous x-ray optical properties of the layer elements of lanthanum and carbon result, in comparison with the best conventional analyzers referred to above with optimized multi-layer arrangements, in reflectivities which are comparable for the detection of beryllium, slightly lower than La—$B_4C$ for boron and also slightly lower for carbon. La—C is the only material combination which has high reflectivity for all three elements Be, B and C at the same time. Furthermore, LaC multi-layer arrangements, for example as La-$B_4C$—multi-layer structures, provide during boron detection for a substantially improved suppression of the oxygen K— as well as the silicon-L lines because of the use of lanthanum as heavy material (reflector). This suppression is also improved for the C-radiation in comparison with the special mirrors of Ni—C, or respectively, V—C layer pairs for the detection of carbon.

In accordance with a preferred embodiment of the apparatus, the multi-layer arrangement comprises 1 to 100 layer pairs that is 2–200 individual layers. The number of layers or layer pairs which are selected for the formation of a certain multi-layer structure depends essentially on the intended measuring task and the type and amount of impurities expected to be present in the sample to be examined.

It is particularly advantageous if the multi-layer structure comprises 40–50 layer pairs that is 80 to 100 individual layers.

In a basic version of the apparatus, the thickness of the respective multi-layer structure is constant. However, it is also possible that the thickness of one layer of each multi-layer pair is different from the other layer of the multi-layer pair.

Basically, it is made sure in the embodiment described above that a parallel fluorescence beam is reflected at the complete surface of the multi-layer structure with maximum intensity.

In another advantageous embodiment, the thickness of the respective multi-layer varies over its extent whereby it is ensured that non-parallel fluorescence rays reaching the multi-layer structure under different incident angles are reflected for the desired wavelength over the full surface of the multi-layer structure with maximum intensity. The different incident angles $\theta$ are compensated for in accordance with the equation given earlier or the corrected modification thereof by a variation of the lattice parameter d, so that $\lambda$ remains constant.

Preferably, the apparatus is so modified that the multi-layer structure is curved or, in another advantageous embodiment, the multi-layer structure is disposed on a support surface (substrate). This however is possible in connection with all embodiments of the multi-layer structure. In this way, it is ensured that a nonparallel fluorescence beam which reaches the multi-layer structure at different points under different incident angles, can be influenced so that for example a divergent fluorescence beam can be converted into a parallel or a focussed fluorescence beam. It may also be advantageous if the thicknesses of the individual layers of the multi-layer structure are different, that is, if their thicknesses vary in a suitable manner so that the multi-layer structure reflects the fluorescence radiation of the desired wavelength which reaches the multi-layer structure under different angles with maximum intensity over the whole area.

The multi-layer structure may comprise a combination wherein one of the layers of the multi-layer pair has a uniform thickness whereas the other layer has a varying thickness.

Preferably, the layer thickness is in the area of 1 to 20 nm. Examinations have revealed that with such layer thicknesses the highest reflectivity and the best resolution of the multi-layer structure can be achieved.

It is particularly advantageous if the layer has a thickness of about 8 nm possibly with a layer thickness ratio of $\Gamma=0.4$ with 100 layer pairs if applicable.

The method for the analysis of atomic and/or molecular elements by means of wavelength dispersive X-ray spectrometric apparatus comprising at least one mirror or focussing arrangement including a multi-layer structure onto which the primary X-ray or electron radiation is directed, wherein particularly fluorescence radiation induced by the incident primary X-ray and electron radiation is directed onto the mirror or focussing arrangement before the radiation is directed onto a measuring or analyzing detector and wherein the mirror or focussing arrangement includes at least one layer pair of a multi-layer structure and a first layer element of the layer pair consists of lanthanum and the second layer of the layer pair consists of carbon.

|  | 109 eV (BE) | 183 eV (B) | 277 eV (C) |
|---|---|---|---|
| La-C | 22.3% | 37.2% | 37.4% |
| Mo-$B_4C$ | 18.3% | 36.4% | 3.0% |
| La-$B_4C$ | 23.7% | 62.6% | 0.9% |
| V-C | 4.2% | 14.6% | 45.1% |
| Cr-C | 6.1% | 18.1% | 45.2% |

Theoretical reflectivity of multi-layers (d=8 nm, $\Gamma=0.4$ and 100 layer pairs) optimized for the Be, B— and C detection.

Generally, the method according to the invention has the same advantages as they have been described for the apparatus according to the invention. Reference is therefore made to the advantages given earlier for the apparatus.

The invention will now be described for a particular embodiment with reference to the attached schematic drawings.

DESCRIPTION OF A PARTICULAR EMBODIMENT

Figure 1:
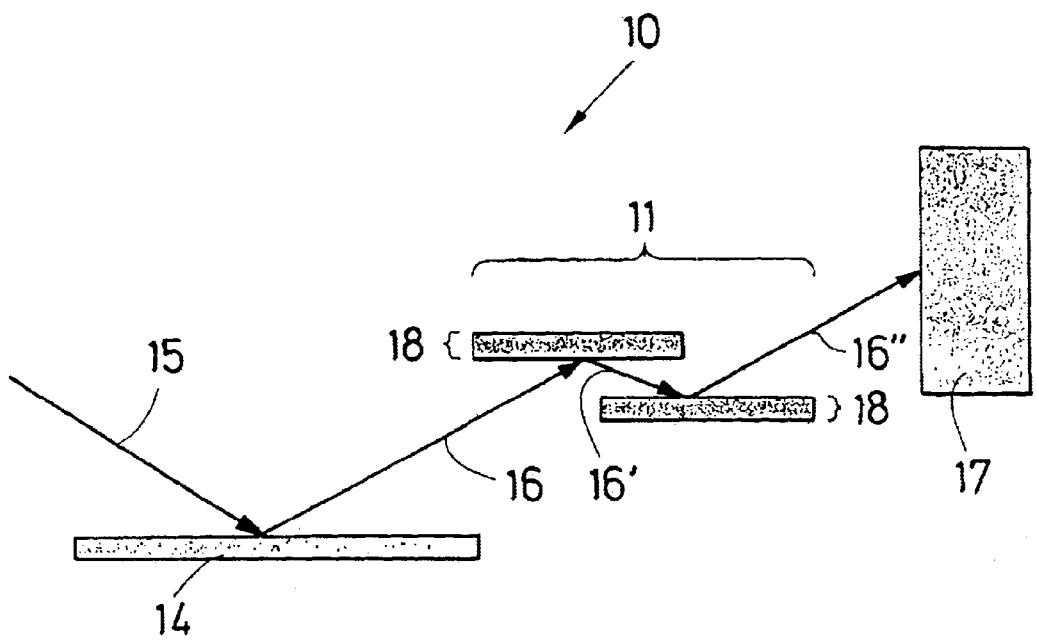
FIG. 1 shows radiation from an X-ray source reaching a sample from which it is reflected onto a multi-layer mirror and then onto a measuring or analysis apparatus (detector)

First reference is made to FIG. 1, which schematically shows an apparatus 10 for the analysis of atomic and/or molecular elements in accordance with the invention as it may be used with some variations for many applications.

From an X-ray or electron source, which is not shown in the figure, primary X-rays or electron rays 15 are emitted and are directed onto a sample 14 for example in the form of a silicon wafer for detecting impurities in the silicon wafer on or near the surface thereof. Because of well-known physical phenomena, fluorescence rays 16 are generated as reflected rays, which include information concerning the type of additional atomic and/or molecular elements contained in the sample 14. The fluorescence rays 16 are directed onto a mirror or focussing device 11, which in the example of FIG. 1 consists of two mirror or focussing devices 11 formed each by a multi-layer structure 12. In another embodiment of the apparatus 10, the focussing device consists only of a mirror or of a focussing structure. The fluorescence rays 16' or 16" reflected from the mirror or focussing device are directed onto a measuring or analysis arrangement (detector) 17 by means of which, in a known manner, quantitative and qualitative information concerning the type of the atomic and/or molecular elements present on, or in the material of, the sample 14 can be obtained.

Figure 2:
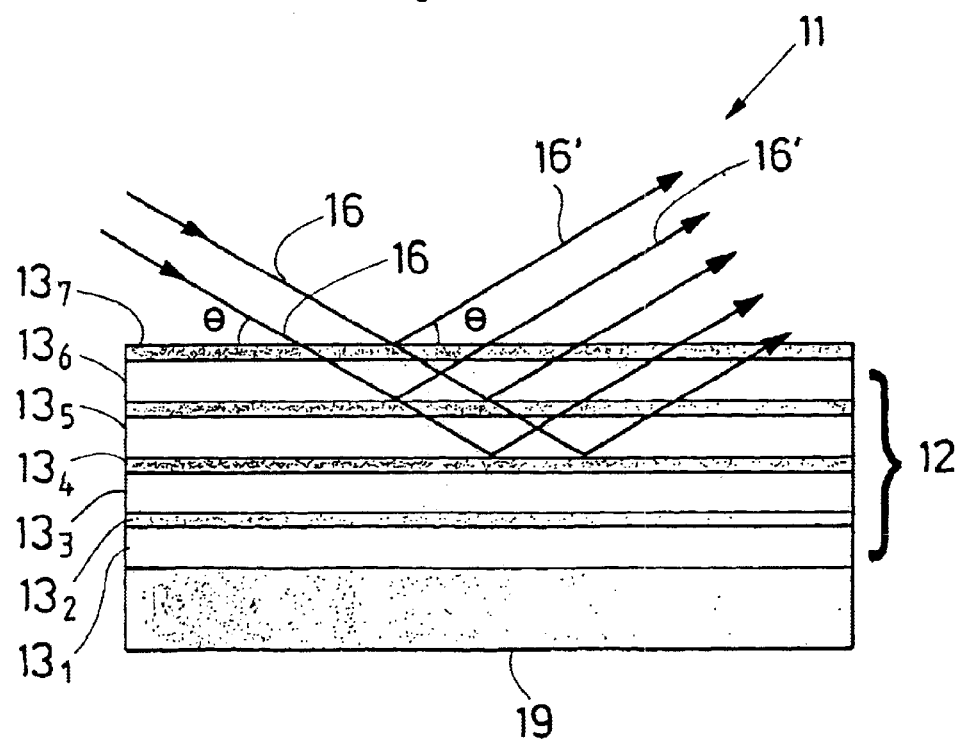
FIG. 2 shows incident rays (in the example fluorescence radiation) reaching the multi-layer structure of the apparatus according to the invention, which multi-layer structure is disposed on a substrate.

FIG. 2 shows a section of the mirror and focussing device 11, which represents the actual multi-layer structure 12 disposed in this case on a substrate 19.

The individual layers $13_1 \ldots 13_n$ form with the plurality of all the pairs $13_1, 13_2; 13_3, 13_4; 13_5, 13_6$ etc. the complete multi-layer structure 12. The layers of each layer pair consist of a La layer and a C layer (second layer element). The order of the layers in each layer pair may be selected as desired. The first layer 131 of a layer pair may for example be lanthanum and the second layer 132 may be carbon. However, the first layer 131 may also be carbon and the second layer 132 may be lanthanum. The incident rays or beam, in the example fluorescence rays 16, are reflected at the interfaces of the different layer pairs and the reflected rays or beams 16, leaving the mirror or focussing structure 11 are directed onto a second mirror or focussing structure 11, see FIG. 1. Reflected from there, they reach the measuring or analysis device 17. However, they may also reach the measuring and analysis device 17 directly without being reflected from a second mirror or focussing structure 11.

Figure 3:
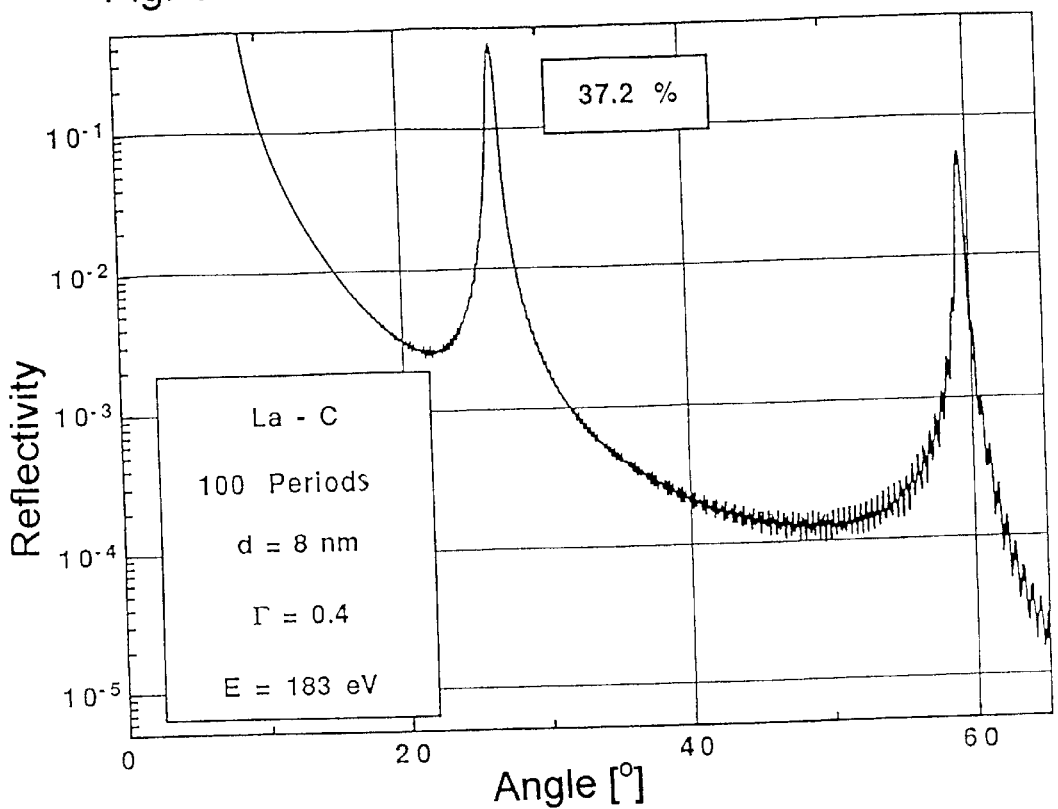
FIG. 3 is a representation of the reflectivity of a La—C multi-layer structure consisting of 100 periods with d=8 nm and a layer thickness ratio $\Gamma=0.4$ as a function of the angle for the boron radiation.
Figure 4:
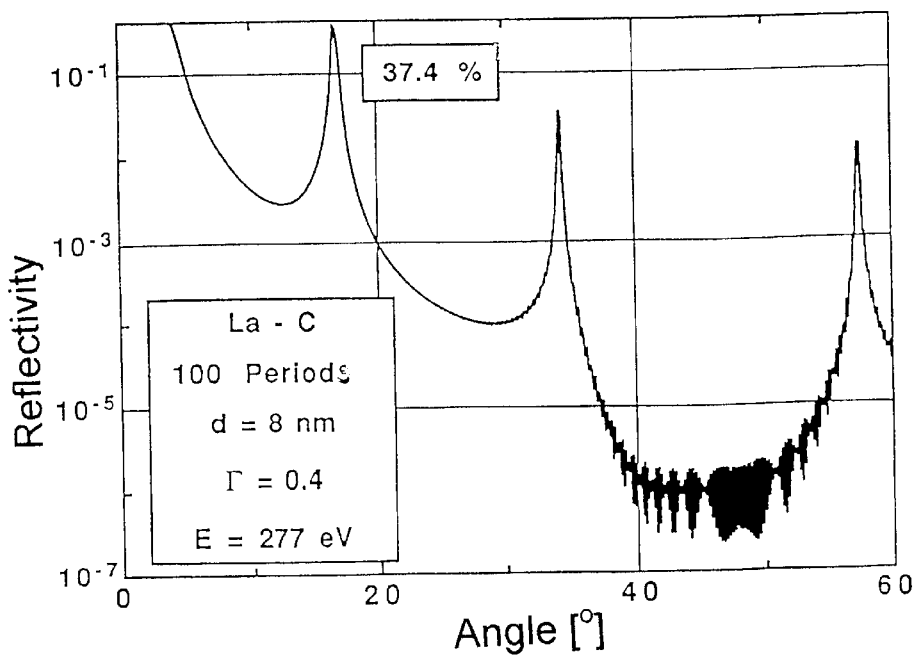
FIG. 4 is a representation of the reflectivity of a La—C multi-layer structure consisting of 100 periods with d=8 nm and a layer thickness ratio $\Gamma=0.4$ as a function of the angle for carbon radiation (277 eV).

From FIG. 3, it is apparent that the multi-layer (La—C-multi-layer) of the FIGS. 3 (for the boron analysis) and 4 (for the carbon analysis) and the table presented earlier provide for obvious advantages. FIGS. 3 and 4 show the theoretical reflectivities of an ideal multi-layer with a layer thickness of $\Gamma=0.4$ and 100 layer pairs. The La—C multi-layer structure has for beryllium and boron a lower reflectivity only with respect to a La—$B_4C$ multi-layer structure but a substantially higher reflectivity than the Mo—$B_4C$ commercially available so far for those elements. In comparison with this layer structure, which is optimal for the Be— and B detection, however the La—C multi-layer structure has a high reflectivity also for carbon which is almost as good as the multi-layer structure V—C or respectively, Cr—C optimized for the C detection. A La—C multi-layer structure can therefor detect the elements Be—B and C with a single analyzer in a way not achievable so far. As a result, for applications in which Be or B and C are to be detected, an analyzer crystal is not needed.

The method according to the invention is performed in accordance with the ray path from the x-ray or electron beam source (not shown) to the measuring or analyzing device (detector) 17 as shown above in connection with FIG. 1, which shows the apparatus 10 according to the invention in an exemplary manner.

What is claimed is:

1. An apparatus for the analysis of atomic and molecular elements by wavelengths dispersive X-ray spectrometric devices comprising a mirror or focussing structure including a multilayer structure onto which fluorescence rays emanating from a sample to be tested by subjecting said sample to primary X-ray or electron radiation are directed and from which they are reflected, and a measuring or analysis detector onto which said reflected fluorescence rays are directed for the analysis of the atomic and molecular elements in said sample, said multilayer structure comprising at least one pair of layer elements of which a first layer element of the pair is formed by lanthanum and the second is formed by carbon.

2. An apparatus according to claim 1, wherein said multi-layer structure includes 1–100 layer pairs.

3. An apparatus according to claim 1, wherein said multi-layer structure includes 40–50 layer pairs.

4. An apparatus according to claim 1, wherein said multi-layer structure has a uniform thickness.

5. An apparatus according to claim 1, wherein said multi-layer structure has a thickness which varies over the extent of the layer.

6. An apparatus according to claim 1, wherein said multi-layer structure is curved.

7. An apparatus according to claim 1, wherein said multi-layer structure is disposed on the surface of a substrate.

8. An apparatus according to claim 7, wherein said substrate is curved.

9. An apparatus according to claim 1, wherein the thicknesses of the individual layers of the multi-layer structure are the same.

10. An apparatus according to claim 1, wherein the thicknesses of the individual layers of the multi-layer structures are different.

11. An apparatus according to claim 1, wherein said layer has a thickness of 1 to 20 nm.

12. An apparatus according to claim 11, wherein said layer has a thickness of about 8 nm.

13. A method of analyzing atomic and molecular elements by a wavelength dispersive x-ray spectrometric device comprising a mirror or focussing arrangement including a multi-layer structure consisting of a plurality of layer pairs and a measuring and analysis detector, said method comprising the steps of directing a primary x-ray or electron beam onto a sample to be tested to induce fluorescence radiation which is then emitted therefrom, directing said fluorescence radiation onto said mirror or focussing structure at an angle such that said fluorescence radiation is reflected therefrom by at least one layer pair of said multi-layer structure, of which a first layer consists of one of lanthanum and the second of one of a carbon, onto a detector for the analysis of the sample.

* * * * *